United States Patent [19]
Niki

[11] Patent Number: 5,490,236
[45] Date of Patent: Feb. 6, 1996

[54] METHOD OF ASSIGNING INITIAL VALUES OF CONNECTION PARAMETERS TO A MULTILAYERED NEURAL NETWORK

[76] Inventor: Toru Niki, c/o Canon Kabushiki Kaisha, 30-2, Shimomaruko 3-chome, Ohta-ku, Tokyo, Japan

[21] Appl. No.: 286,914

[22] Filed: Aug. 8, 1994

Related U.S. Application Data

[63] Continuation of Ser. No. 171,980, Dec. 23, 1993, abandoned, which is a continuation of Ser. No. 4,680, Jan. 14, 1993, abandoned, which is a continuation of Ser. No. 526,650, May 22, 1990, abandoned.

[30] Foreign Application Priority Data

May 22, 1989 [JP] Japan ................................. 1-129860

[51] Int. Cl.$^6$ ................................... G06F 15/18
[52] U.S. Cl. ................................. 395/23; 395/22
[58] Field of Search ................... 395/22, 23, 21

[56] References Cited

U.S. PATENT DOCUMENTS

| | | | |
|---|---|---|---|
| 4,912,647 | 3/1990 | Wood | 364/513 |
| 4,918,618 | 4/1990 | Tomlinson, Jr. | 364/513 |
| 4,941,122 | 7/1990 | Weideman | 364/807 |
| 4,945,494 | 7/1990 | Penz et al. | 364/513 |
| 4,979,126 | 12/1990 | Pao et al. | 364/513 |

OTHER PUBLICATIONS

Rumelhart et al., Parallel Distributed Processing, vol. 1, Foundations, MIT Press, 1986, pp. 318–362.
White, H., "Learning in Artificial Neural Networks: A Statistical Perspective", Neural Computation 1, 1989, pp. 425–464.
Lari–Najafi et al., "Effect of Initial Weights on Back–Propagation and its variations," 1989 IEEE Intl. Conf. on Systems, Man and Cybernetics, 14–17 Nov. 1989, 218–219.
Yau et al., "Sigma–Pi Implementation of a Gaussian classifier," IJCNN '90, Jun. 1990, III–825–III–830.
Partial translation of "Multivariate Analysis Handbook", Haruo Yanai et al. (1986) pp. 132–144.

*Primary Examiner*—Robert W. Downs

[57] ABSTRACT

A generator in a back propagation type neural network having an input layer, an output layer and an intermediate layer coupled the input and output layers forms initial values for connection parameters. A first generator produces an initial value W10 of a weight coefficient of each connection parameter of the intermediate layer from in-class covariant data SW and inter-class co-variant data SB over data inputted to the input layer. The produced values are set into respective synapses of the intermediate layer as connection parameters.

22 Claims, 7 Drawing Sheets

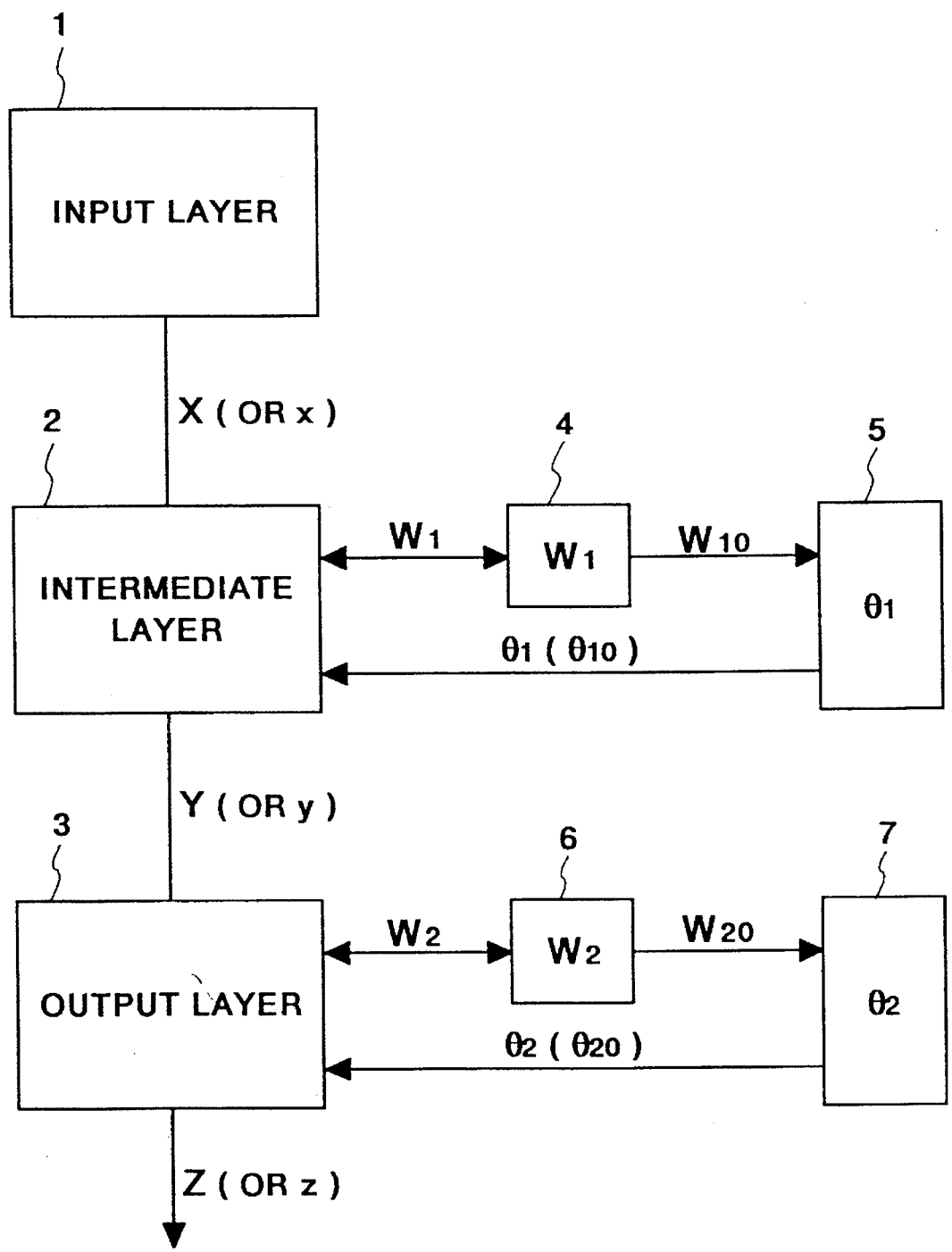
F I G. 1

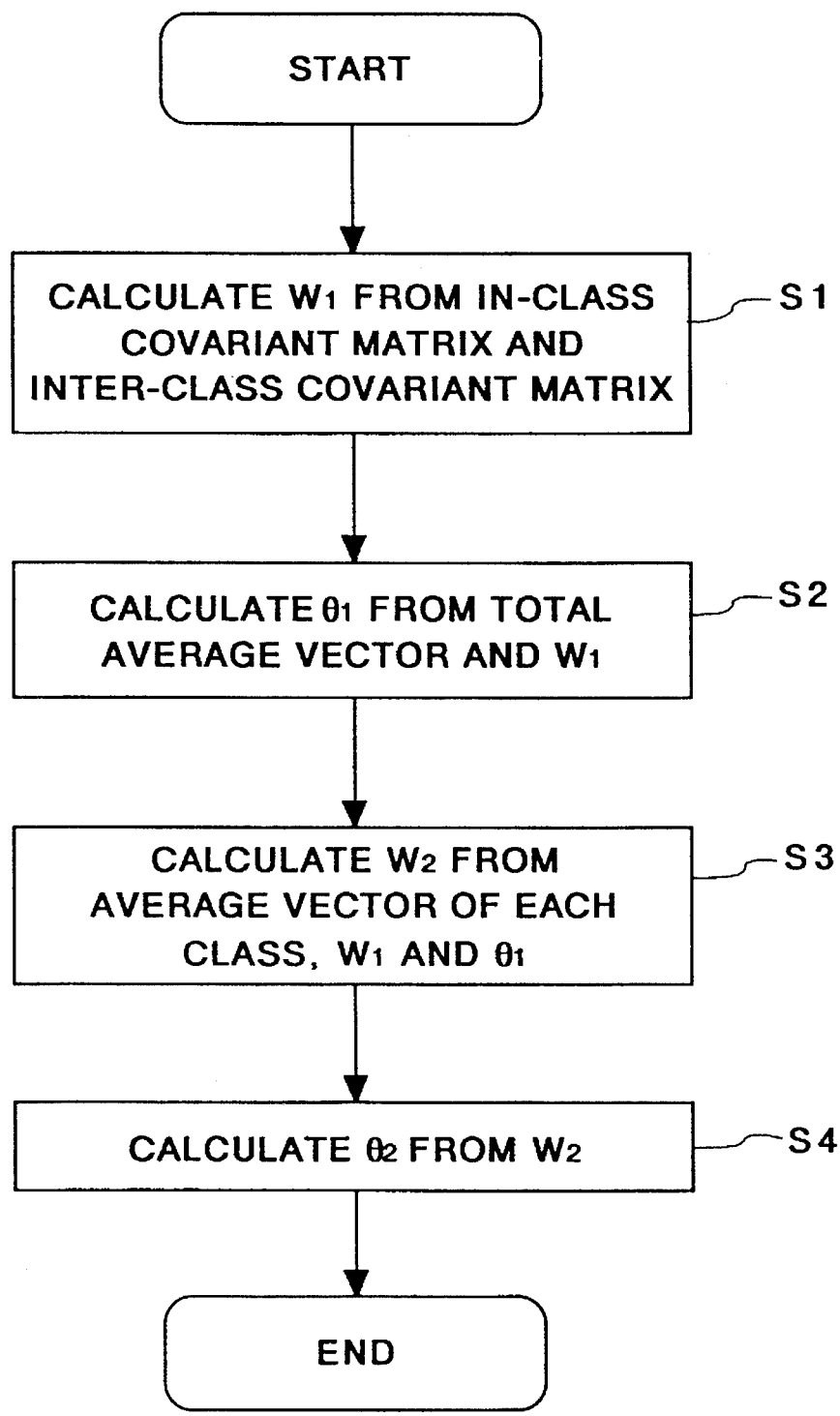
F I G. 2

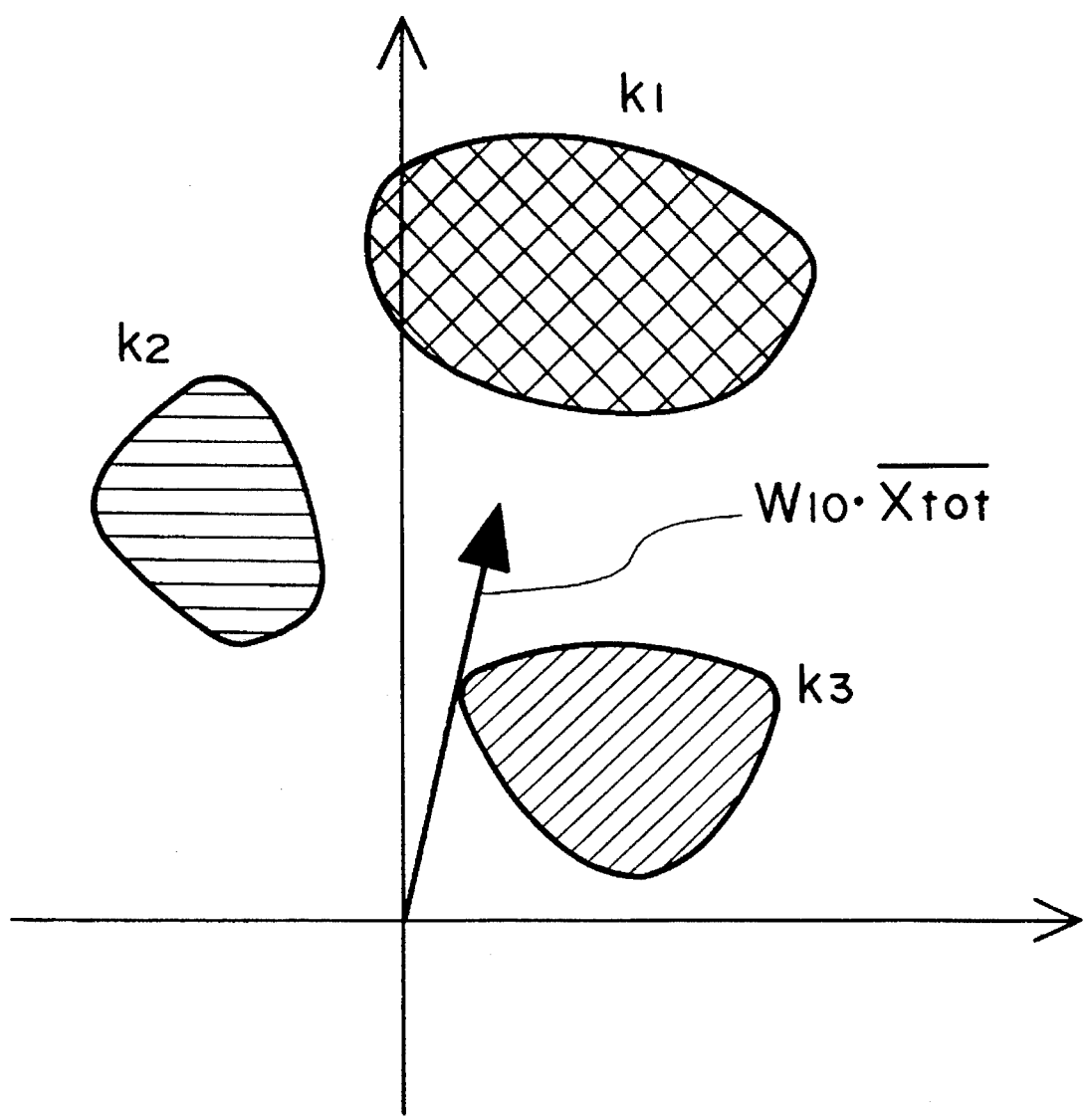
F I G. 4

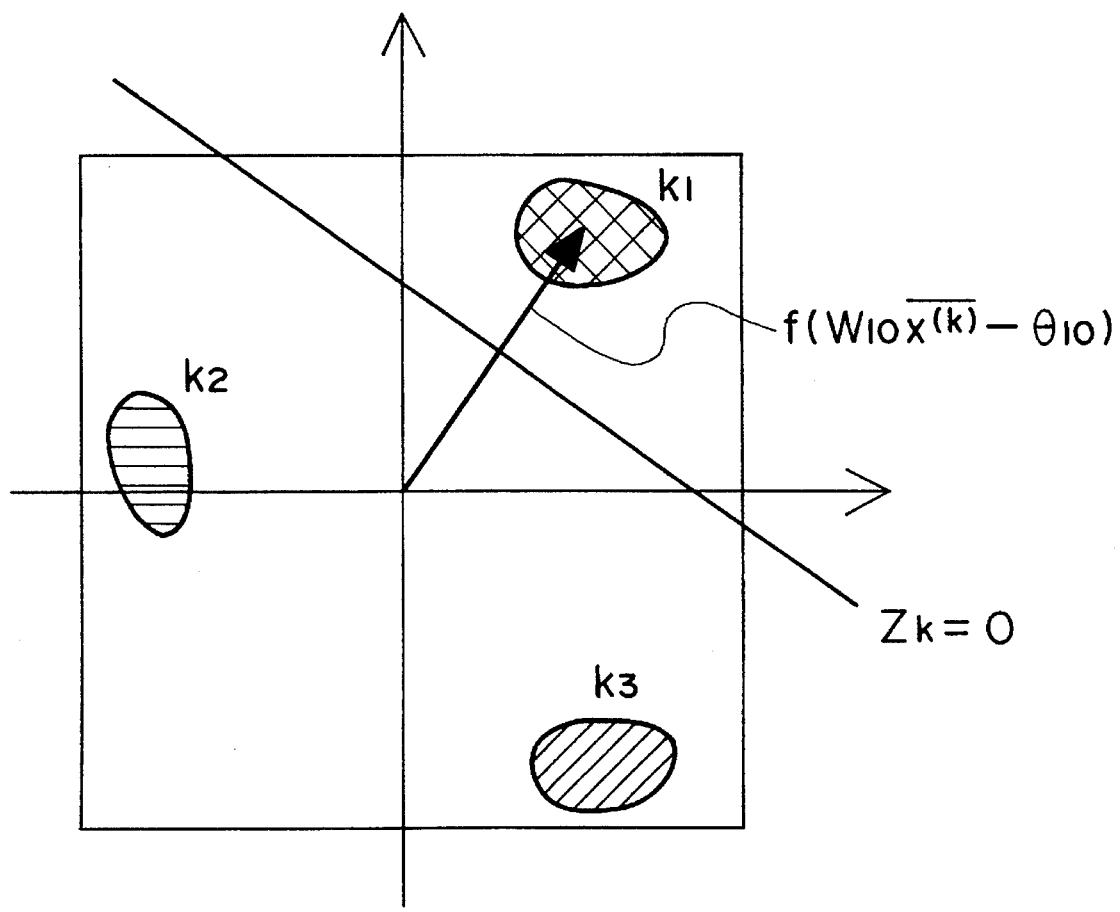
F I G. 7

METHOD OF ASSIGNING INITIAL VALUES OF CONNECTION PARAMETERS TO A MULTILAYERED NEURAL NETWORK

This application is a continuation-in-part of application Ser. No. 08/171,980 filed Dec. 23, 1993, now abandoned, which is a continuation of application Ser. No. 08/004,680 filed Jan. 14, 1993, abandoned, which is a continuation of application Ser. No. 07/526,650, filed May 22, 1990, abandoned.

BACKGROUND OF THE INVENTION

The present invention relates to a neural network which can be used, for example, for character recognition and, in particular, to a method of assigning initial values for learning the connection parameters of a neural network by utilizing statistical information on input data.

For example, as shown in FIG. 1, in a back propagation type neural network, synapse elements of an input layer, an intermediate layer and an output layer are generally connected in a network form. The connection between synapse elements is represented by synapse parameters (or a weight coefficient W and a bias θ). Adjusting these parameters to suitable values is called learning. If the network is used for character recognition, learning is achieved using learning data for character recognition. If it is used for picture image processing, learning is achieved using learning data for picture image processing; if such learning is sufficient to determine parameters appropriately and synapse parameters are set to these determined values, thereafter, this neural network performs character recognition, picture image processing and the like in accordance with the learning.

In a neural network, therefore, setting the above-mentioned synapse parameters suitably, i.e., setting efficiently and suitably, is very important.

In learning of a neural network, a back propagation method is generally performed. In the learning of a weight coefficient W and a bias θ of the synapse elements of this back propagation type neural network, regarding the weight coefficient W and bias θ, correction is made to the weight coefficient W (n) and bias θ(n) beginning with initial values W(O) and θ(O) in the learning process. However, there are at present no theoretical grounds for preferring any particular set of initial values as the starting point for the learning of the weight coefficient W and bias θ. Under the existing circumstances, a small random number is generally used for each element as the initial value.

The problems regarding a weight coefficient that arise in a conventional learning method will be explained in detail.

In a back propagation algorithm, a weight coefficient $w_{ij}$ between two synapse elements i, j is successively corrected by using a correction amount $\Delta w_{ij}$. That is, $$w_{ij}(n+1) = w_{ij}(n) + \Delta w_{ij} \tag{1}$$

In the above equation, i denotes elements of the input side; j denotes elements of the output side. The correction amount $\Delta w_{ij}$ is calculated from the following equation.

$$\Delta w_{ij} = -\eta \cdot \frac{\partial E}{\partial w_{ij}} \tag{2}$$

where η is a positive constant and E is an error of the entire network given by the following equation.

$$E = 1/2 \cdot \sum_j (t_j - y_j)^2 \tag{3}$$

where $t_j$ is a teacher signal, and $y_j$ is the output signal of an output-side synapse element. $\partial g/\partial w_{ij}$ is calculated using outputs of each layer, but the explanation of a concrete calculation method is omitted.

The correction of a weight coefficient $W_{ij}$ (this step is called learning) is performed as described above and it is expected that the weight coefficient will converge on a suitable value through repetition of the learning steps. At this time, to make the value converge on a suitable value quickly, it is important to start with the right initial value $w_{ij}(O)$.

The learning of bias θj for an element j is performed by means of a learning process similarly to $w_{ij}$ such that the bias θj is regarded as a weight coefficient for input data that may be assigned a "1" at any time as a value.

As described above, since a back propagation type neural network is dependent on the initial values mentioned above regarding a weight coefficient and a bias in the learning process, the above-mentioned conventional technology, in which random numbers are used as initial values for a weight coefficient $W=\{w_{i,j}\}$ and a bias $\theta=\{\theta_j\}$, entails the possibility that (1) the learning time will be inordinately long and (2) a parameter will fall into a minimum value which is not optimum in the midway of learning and this minimum value will be erroneously taken as a suitable value.

SUMMARY OF THE INVENTION

According to the present invention, in a back propagation type neural network having the three layers —an input layer, an intermediate layer and an output layer, a calculation means is provided for calculating a weight coefficient matrix of an intermediate layer from a in-class covariant matrix and a inter-class covariant matrix of input data of an input layer and initial values of a weight coefficient matrix of an intermediate layer are determined from the input data.

According to the present invention, in a back propagation type neural network having the three layers—an input layer, an intermediate layer, and an output layer, a calculation means is provided for calculating a vector representing the bias of an intermediate layer from a total average vector of input data of an input layer and a weight coefficient matrix of an intermediate layer and an initial value of a vector representing the bias of an intermediate layer is determined from the input data.

According to the present invention, in a back propagation type neural network having three layers—an input layer, an intermediate layer, and an output layer, a calculation means is provided for calculating the weight coefficient matrix of an output layer from an average vector of each class of input data of an input layer, a weight coefficient matrix of an intermediate layer and a vector representing the bias of an intermediate layer and initial values of a weight coefficient matrix of an output layer are determined from the input data.

According to the present invention, in a back propagation type neural network having three layers—an input layer, an intermediate layer, and an output layer, a calculation means is provided for calculating a vector representing the bias of an output layer from a weight coefficient matrix of an output layer and an initial value of the bias of the output layer is determined from the input data.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 1 is a block diagram showing the configuration of the neural network in one embodiment of the present invention;

FIG. 2 is a flowchart showing an initial value determination process;

FIG. 4 is a view showing the distribution of vector $W_1 \cdot x$;

FIG. 7 is an view for explaining a method of determining $W_{20}(K)$ and bias $\theta_{20}(K)$.

DESCRIPTION OF THE PREFERRED EMBODIMENTS

Figure 3:
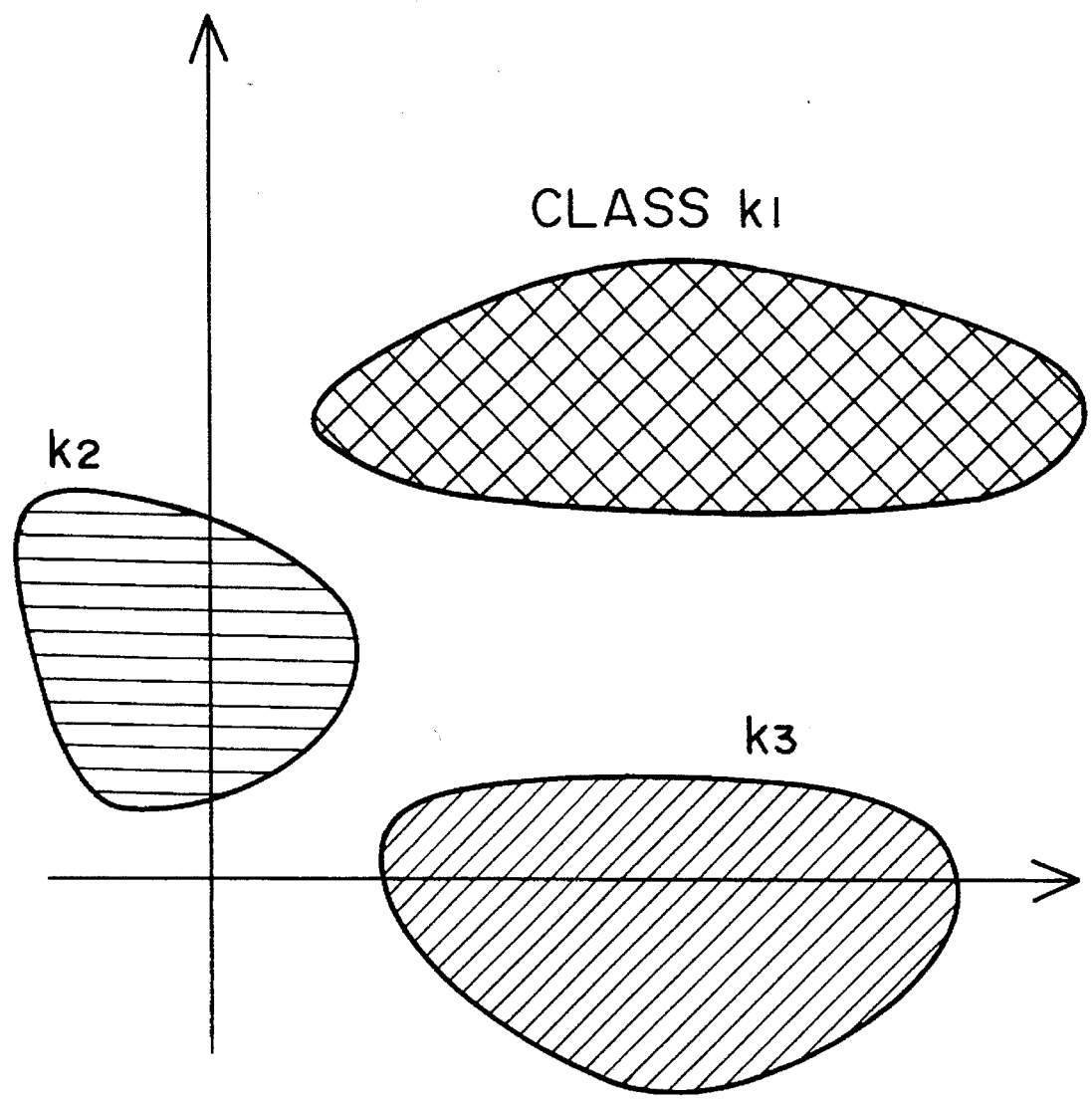
FIG. 3 is a view showing the distribution of input data x.

One embodiment of the present invention will be explained in detail hereinunder with reference to the drawings. This embodiment is made up of an input layer, intermediate layers, and an output layer, in this embodiment, one layer is formed as an example of intermediate layers.

FIG. 1 is a block diagram of a neural network of this embodiment. In this figure, the neural network consists of one input layer 1, one intermediate layer 2, and one output layer 3.

Where the parameters of the synapse elements of this network are suitably set, input data X is received by the synapses of the input layer 1 and sent to the synapses of the intermediate layer 2. The intermediate layer 2 multiplies the input data X sent from the input layer 1 by a weight coefficient $W_1$, adds a bias $\theta_1$ to operate a transfer function (in this embodiment, a sigmoid function is selected as a transfer function), and outputs the resulting data Y to the output layer 3. The output layer 3 multiplies the input data Y sent from the input layer 2 by a weight coefficient $W_2$, add a bias $\theta_2$ to operate a transfer function, and outputs the resulting data Z.

The above is the explanation of the flow of data in general data processing, after learning, by the neural network of this embodiment.

Shown in FIG. 1 are weight coefficient calculation sections 4 and 6 for calculating weight coefficient matrices $W_1$ and $W_2$, respectively, in a learning process. Also shown are bias calculation sections 5 and 7 for calculating biases $\theta_1$ and $\theta_2$, respectively. The method of calculating the learning values of $W_1$, $W_2$, $\theta_1$ and $\theta_2$ by these calculation sections follows a back propagation method. The method is well known and therefore an explanation thereof is omitted. Next, a method of assigning the initial values of these parameters $W_{10}$, $W_{20}$, $\theta_{10}$ and $\theta_{20}$, a feature of this invention, will be explained.

The procedure of assigning initial values in this embodiment will be explained with the flowchart in FIG. 2 with reference to FIG. 1. In this embodiment, data input for learning are represented by x, y and z to discriminate the above-mentioned X, Y and Z. From the statistical properties of the learning data x, the calculation sections 4, 5, 6 and 7 assign initial values $W_{10}$, $W_{20}$, $\theta_{10}$ and $\theta_{20}$. Because the learning data x, y, z are represented as vectors, these are also called vectors x, y, z in this specification.

First, in step S1, the weight coefficient calculation section 4 calculates the initial value $W_{10}$ for a weight coefficient matrix of the intermediate layer from the in-class covariant matrix and the inter-class covariant matrix of the input data x. Next, in step S2, the bias calculation section 5 calculates the bias initial value $\theta_{10}$ from the total average vector $\overline{x_{tot}}$ of input data and the weight coefficient matrix $W_{10}$ of the intermediate layer. The indicates an average value. Next, in step S3, the weight coefficient matrix calculation section 6 calculates the initial value $W_{20}$ of the weight coefficient matrix of the output layer from an average vector $\overline{x^{(k)}}$ of each class of input data, the weight coefficient matrix $W_{10}$ of the intermediate layer and the bias $\theta_{10}$ of the intermediate layer. In step S4, the bias calculation section 7 calculates the bias $\theta_{20}$ of the output layer from the weight coefficient matrix $W_{20}$ of the output layer.

Each calculation in the above procedure will be explained more in detail below using equations.

When the neural network of the present invention is used, for example, in a character recognition apparatus, input data becomes a feature vector representing the feature of a character, extracted from a character image. All input data is represented by an M dimensional vector and it is assumed that the data belongs to any one of K sets of classes.

If the number of data contained in each class is set at n and the j-th input data of class k (k=1, 2, ..., K) is represented by $x_j^{(k)}$ the following statistical quantities can be calculated from the distribution of input data; namely, an input vector average $\overline{x(k)}$ of each class, an average value $\overline{x_{tot}}$ over all the classes, a covariant matrix $S^{(k)}$ of each class, an in-class covariant matrix $S_W$, and an inter-class covariant matrix $S_B$.

$$\overline{x^{(k)}} = \frac{1}{n} \cdot \sum_j x_j^{(k)} \qquad (4)$$

$$\overline{x_{tot}} = \frac{1}{K} \cdot \sum_k \overline{x^{(k)}} \qquad (5)$$

$$S^{(k)} = \frac{1}{n} \cdot \sum_j (x_j^{(k)} - \overline{x^{(k)}})^T (x_j^{(k)} - \overline{x^{(k)}}) \qquad (6)$$

$$S_W = \frac{1}{K} \sum_k S^{(k)} \qquad (7)$$

$$S_B = \frac{1}{K} \cdot \sum_k (\overline{x^{(k)}} - \overline{x_{tot}})^T (\overline{x^{(k)}} - \overline{x_{tot}}) \qquad (8)$$

In the above equations, T in $(\ )^T$ represents a transposition.

A signal processing in a back propagation type neural network made up of three layers—the input layer 1, the intermediate layer 2, and the output layer 3—can be represented by the following equations if the dimension of the input vector x is set at M, the number of elements of the intermediate layer, at N, and the number of classes to be classified, at K. That is, $$y = f(W_{10}x - \theta_{10}) \qquad (10)$$

$$z = f(W_{20}y - \theta_{20}) \qquad (11)$$

where x: input data ($X \in R^M$)

y: output from intermediate layer ($y \in R^N$)

z: output from output layer ($z \in R^K$)

$W_{10}$: weight coefficient matrix of intermediate layer (N x M matrix)

$\theta_{10}$: bias of intermediate layer ($\theta_{10} \in R^N$)

$W_{20}$: weight coefficient matrix of output layer (K x N matrix)

$\theta_{20}$: bias of output layer ($\theta_{20} \in R^K$).

f indicates that a sigmoid function, $$f(s) = \frac{1}{1 + \exp(-s)} - \frac{1}{2} \qquad (12)$$

is operated on the components of the vector.

As learning is performed according to a back propagation algorithm and the values of the weight coefficient W and the bias $\theta$ have come to converge on an ideal value, an output such that $$z_j = \begin{cases} \frac{1}{2} & \text{for } j = k \\ \frac{-1}{2} & \text{for } j \neq k \end{cases}$$

is made from the j-th synapse element of the output layer to the input vector $x^{(k)}$ belonging to class k.

In the present invention, to assign the initial value $W_{10}$ of the weight coefficient of the intermediate layer, "The method of linear discriminant mapping" is used. (For example, refer to "Handbook of Multivariate Analysis", by Yanai and Takagi, Gendai Suugaskusha.)

Linear discrimination mapping intends to select, as the evaluation criterion for discrimination, a linear mapping A (y=A. x: $x \in R^M$, $y \in R^N$) such that "the inter-class covariation becomes as large as possible and, at the same time, the in-class covariation becomes as small as possible".

When this method of linear discrimination mapping is applied to determine the initial value $W_{10}$ of a weight coefficient of the intermediate layer, a problem of finding a mapping A such that an inter-class covariant $S_B$ becomes maximum while keeping an in-class covariant $S_W$ constant, reduces to an eigen value problem of finding an eigen value $\lambda_i$ and an engine vector $a_i$ that satisfy the relation $$S_w a_i = \lambda_i S_B a_i \qquad (13)$$

When the eigen value $\lambda_i$ and the eigen vector $a_i$ are found by solving an eigen problem, an eigen vector matrix, in which eigen vectors $(a_1, a_2, \ldots, a_N)$ corresponding to N pieces of $(\lambda_i, \lambda_2, \ldots, \lambda_N)$ that are taken from such an eigen value $\lambda_i$ in a descending order, becomes a linear discrimination mapping A to be determined. That is, $$A = (a_1, a_2, \ldots, a_N) \qquad (14)$$

A transposed matrix of this eigen vector matrix is given as the weight coefficient matrix $W_{10}$ of the intermediate layer. That is, $$W_{10} = A^T \qquad (15)$$

The above results will be explained in detail using FIGS. 3 and 4.

The distribution of x when the dimension M of the input vector x is set at 2 and the classes are set at 3 of $k_1$, $k_2$ and $k_3$, is shown in FIG. 3. As shown in FIG. 3, for example, it is assumed that an input vector of each class has a tendency such that it is distributed in a lateral direction in classes $k_1$ and $k_2$. Thus, if, keeping the inclass covariant $S_W$ constant, a transposed matrix of a mapping A such that the inter-class covariant $S_B$ becomes maximum is defined to be the initial value $W_{10}$ of the weight coefficient of the intermediate layer, the input vector of each class shows the distribution shown in FIG. 4 by the mapping of $W_{10}$ x. That is, a variance is maximum among input vectors in the different classes by the mapping of $W_{10}$. x and the extension of the variance is small among the input vectors in the same class. In other words, if $W_{10}$ ($=A^T$) is taken as the initial value of a weight coefficient matrix, convergence in a learning process is quickened.

Figure 5:
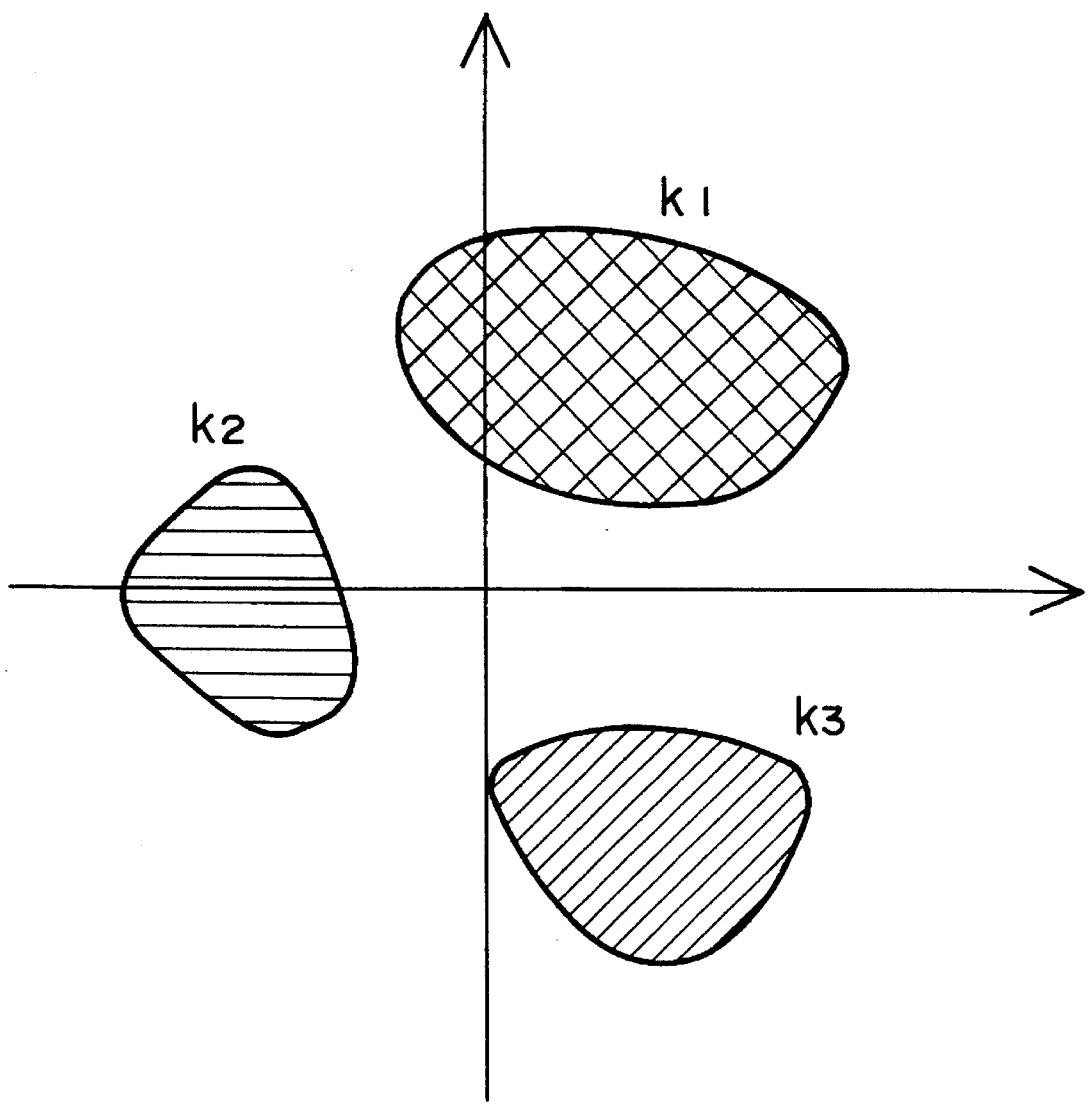
FIG. 5 is a view showing the distribution of vector $W_1 \cdot x - \theta_1$.
Figure 6:
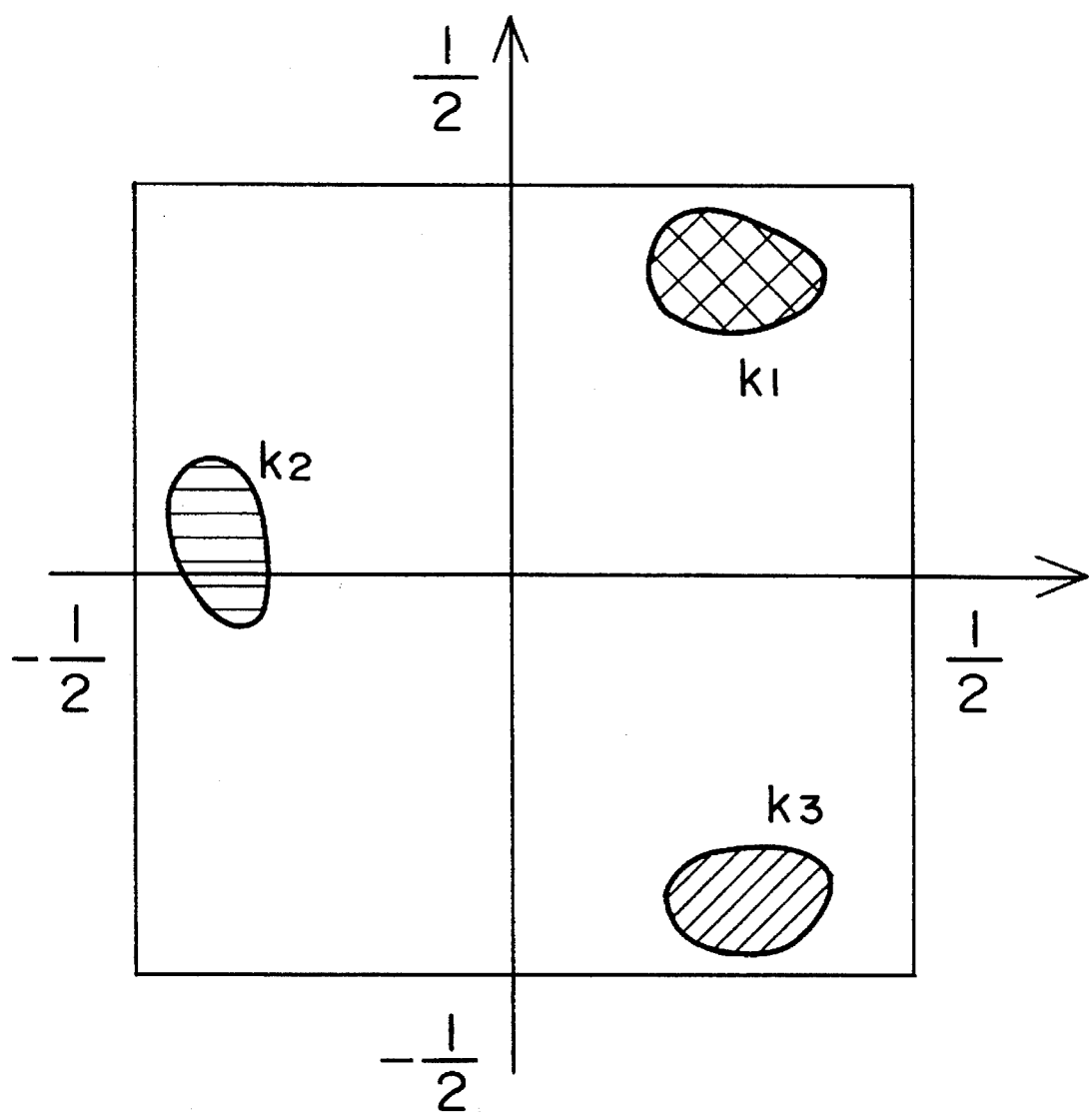
FIG. 6 is a view showing the distribution of vector $f(W_1 \cdot x - \theta_1)$.

Assignment of the initial value $\theta_{10}$ of a bias is explained next.

$$\theta_{10} = W_{10} \overline{x_{tot}} \qquad (16)$$

where $\overline{x_{tot}}$ is a total average vector obtained by taking the average of vector x over all the classes. FIG. 4 shows $W_{10} \overline{x_{tot}}$ by mapping $W_{10}$. The assignment of $\theta_{10}$ as in equation (16) causes the distribution of the vector obtained by the conversion of $W_{10}x - \theta_{10}$ to the input vector x to become as shown in FIG. 5, and the center of the distribution moves to the origin.

Further, since the distribution of the output $y = f(W_{10}x - \theta_{10})$ from the intermediate layer is obtained by operating the sigmoid function of equation (12) on the components of the vector, the region of the values of each component is suppressed to a section $[-1/2, 1/2]$.

Next, a method of assigning the initial value $W_{20}$ of the weight coefficient matrix of the output layer and the bias $\theta_{20}$ will be explained.

Among the synapse elements of the output layer, element Zk is assumed to output $1/2$ for the input of data belonging to solely class k, and output $-1/2$ for the other inputs. And if the initial value of the weight coefficient vector for the Zk is denoted by $W_{20}^{(k)}$ and the initial value of the bias is denoted by $\theta_{20}^{(k)}$. Then the output zk from such elements becomes as follows:

$$z_k = f(W_{20}^{(k)T} \cdot y - \theta_{20}^{(k)}) \qquad (17)$$

T represents transposition.

The set of vectors that satisfy $(W_{20}^{(k)T} \cdot y - \theta_{20}^{(k)}) = 0$ represents a hyperplane that includes $f(W_{10}\overline{x^{(k)}} - \theta_{10})$, which is an image of an average vector $\overline{x^{(k)}}$ of class k on the positive area side and includes the images of the other classes on the negative area side. To be specific, in FIG. 7, the set of $f(W_{10}\overline{x^{(k)}} - \theta_{10})$ for the input vector x of class $k_1$ is included in a positive area and the set of $f(W_{10}\overline{x^{(k)}} - \theta_{10})$ for the input vector x of classes $k_2$ and $k_3$ ($\neq k_1$) is included in a negative area.

Thus, the following are defined:

$$W_{20}^{(k)} = f(W_{10} \cdot \overline{x^{(k)}} - \theta_{10}) \qquad (18)$$

$$\theta_{20}^{(k)} = \alpha \|W_{20}^{(k)}\| \qquad (19)$$

$\alpha$ is a positive constant less than 1 and, for example, may be set to 0.5.

In such a case, as shown in FIG. 7, the set of vectors that satisfy $z_k = 0$ passes a midpoint between an image $\overline{y^{(k)}}$ of $\overline{x^{(k)}}$ and the origin and represents a K-1 dimensional hyperplane perpendicular to $\overline{y^{(k)}}$.

Thus, those in which initial values $W_{20}^{(k)}$ and $\theta_{20}^{(k)}$ of a parameter for class k are arrayed become a matrix $W_{20}$ representing the initial values of the weight coefficient of the output layer and a matrix $\theta_{20}$ representing the bias initial value of the output layer, respectively. That is, $$W_{20} = (W_{20}^{(1)}, W_{20}^{(2)}, \ldots, W_{20}^{(k)})^T$$

$$\theta_{20}=(\theta_{20}^{(1)}, \theta_{20}^{(2)}, \ldots, \theta_{20}^{(k)})$$

From the above procedure, $W_{10}$, $\theta_{10}$, $W_{20}$, and $\theta_{20}$ are determined.

The initial values obtained from the above-mentioned method are good estimate values obtained by the theory of linear mapping. Ordinary input data is nonlinear. However, input data handled by the neural network of the above-mentioned embodiment is thought to have a small nonlinearity and therefore they are values more proper than those obtained by a conventional method of adopting a random number as an initial value.

Various modifications are possible within the scope not departing from the spirit of the present invention.

For example, a suitable normalization may be performed on the weight coefficient matrices W10 and W20 and biases $\theta_{10}$ and $\theta_{20}$ used in the above-mentioned embodiment to change the norm.

A transfer function f is not limited to the format of equation (12). For example, any function may be used if it is differentiable, monotone increasing and a suppression type.

Some of $W_{10}$, $\theta_{10}$, $W_{20}$, and $\theta_{20}$ may be assigned with a random number as in the prior art rather than all values of these being determined according to the above-mentioned embodiment.

Accordingly, in the neural network of the present invention, estimate values obtained on the basis of statistical information (average value, covariant matrix) of input data are adopted in place of a conventional method of assigning a random number as an initial value of a weight coefficient of each element and/or an initial value of a bias. As a result, learning time is considerably shortened over the conventional art which uses a random number as an initial value, and the advantage can be obtained that the possibility of falling to a minimum value which is not optimum is lessened.

The present invention is not limited to the above embodiments and various changes and modifications can be made within the spirit and scope of the present invention. Therefore, to apprise the public of the scope of the present invention the following claims are made.

What is claimed is:

1. An apparatus for classifying input data representing a physical quantity into predetermined k classes, each class designating a set including a plurality of data which have similar characteristics, said apparatus comprising a neural network comprising an input layer, an output layer, and an intermediate layer coupled between the input layer and the output layer, and determining means for determining connection parameters between the layers of said neural network by using training data prior to classifying the input data, the connection parameters being represented at least by a weight coefficient, wherein the input layer includes means for inputting data;

the intermediate layer includes means for receiving data from the input layer and processing the received data by means of the connection parameters;

the output layer includes means for receiving data processed by the intermediate layer, processing the received data by means of the connection parameters, and outputting signals indicating one of the predetermined k classes; and the determining means comprises:

a first generating means for generating initial value data $W_{10}$ of the weight coefficient of each connection parameter of the intermediate layer from in-class dispersion data $S_W$ and inter-class dispersion data $S_B$ of the training data over all classes into which the training data has been partitioned, said in-class dispersion data $S_W$ representing a dispersion degree of the training data within a class and said inter-class dispersion data $S_B$ representing a dispersion degree of the training data over classes;

setting means for setting the generated initial value data into the respective synapses of the intermediate layer, as connection parameters; and correction means for correcting the connection parameters by using a back-propagation learning method.

2. The apparatus according to claim 1, wherein said first generating means calculates the matrix data of said inclass covariant $S_W$ and the matrix data of interclass covariant $S_B$ when input data is represented as a vector, calculates the data of a matrix representing a mapping A such that the interclass covariant matrix data $S_B$ becomes maximum while keeping the in-class covariant matrix data $S_W$ constant and calculates said initial value data $W_{10}$ by calculating the transposed matrix of the calculated matrix representing the mapping A.

3. A method for classifying input data representing a physical quantity into predetermined k classes, each class designating a set including a plurality of data which have a similar characteristic, by using a back propagation type neural network having an input layer, an output layer and an intermediate layer coupled between the input and output layers, each layer comprising a network of synapse elements and connections between the synapse elements, each connection being represented by a connection parameter which includes at least a weight coefficient, the method comprising the steps of:

(a) partitioning a plurality of training data x into k classes;

(b) generating data representing an in-class dispersion matrix $S_W$ and data representing an inter-class dispersion matrix $S_B$ of the training data over all classes into which the training data has been partitioned, each class designating a set in which a plurality of training data which have similar characteristics are included, said in-class dispersion data $S_W$ representing a dispersion degree of the training data within a class and said inter-class dispersion data $S_B$ representing a dispersion degree of the training data over classes on the basis of the plurality of input data;

(c) determining initial values $W_{10}$ of the weight coefficients of the synapses of the intermediate layer on the basis of the data representing said inter-class dispersion matrix $S_W$ and said in-class dispersion matrix $S_B$; and (d) determining final values of said weight coefficients of the synapses of the intermediate layer beginning with the initial values $W_{10}$ according to back propagation type learning method in which training is input via said input layer, and setting connection parameters including the determined final weight coefficients into the respective synapses of the intermediate layer;

(e) inputting input data to the input layer;

(f) processing the input data through the intermediate layer having the determined weight coefficients; and (g) further processing the data processed through the intermediate layer by means of the output layer, and outputting from the output layer signals indicating one of the predetermined k classes to which the input data belongs.

4. The learning method according to claim 3, wherein said step (c) further comprises the steps of:

(c1) forming a mapping A, such that the inter-class covariant matrix $S_B$ becomes maximum while keeping said in-class covariant matrix $S_W$ constant; and (c2) generating said initial value $W_{10}$ by calculating a transposed matrix of a matrix representing the mapping A.

5. An apparatus for classifying input data representing a physical quantity into predetermined k classes, each class designating a set including a plurality of data which have similar characteristics, said apparatus comprising:

a back propagation type neural network including an input layer, an output layer, and an intermediate layer coupled between the input layer and the output layer; and determining means for determining connection parameters between the layers of said neural network by using training data prior to classifying the input data, each connection parameter being represented by a weight coefficient and a bias $\theta$, wherein the neural network input layer includes means for inputting data;

the neural network intermediate layer includes means for receiving data from the input layer and processing the received data by means of the connection parameters;

the neural network output layer includes means for receiving data processed by the intermediate layer, processing the received data by means of the connection parameters and outputting signals indicating one of the predetermined k classes; and the determining means comprises:

generating means for generating data representing an initial value $\theta_{10}$ of the bias of each connection parameter of the intermediate layer from a total average x of input data x to be input to synapses of the input layer and a weight coefficient $W_{10}$ of each connection parameter of the intermediate layer; and setting means for setting the generated initial values $\theta_{10}$ and $W_{10}$ into the respective synapses of the intermediate layer, as beginning connection parameters for the back propagation type neural network.

6. The apparatus according to claim 5, wherein said generating means generates a vector representing the bias $\theta_{10}$ of the intermediate layer on the basis of $\theta_{10} = W_{10} x_{tot}$ wherein $x_{tot}$ denotes a total average vector of the input data x.

7. The apparatus according to claim 5, wherein said network accepts input data x as vector input, further includes a third generating means for forming the initial value $W_{10}$ of the weight coefficient of the intermediate layer from the in-class covariant matrix $S_W$ and the inter-class covariant matrix $S_B$ of the vector x, and said second generating means generates the bias $\theta_{10}$ of said intermediate layer by using the initial value of the weight coefficient of the intermediate layer formed by the third generating means.

8. A method for classifying input data representing a physical quantity into predetermined k classes, each class designating a set including a plurality of data which have a similar characteristic., by using a back propagation type neural network having an input layer, an output layer and an intermediate layer coupled between the input and output layers, each layer comprising a network of synapse elements and connections between the synapse elements, each connection being represented by a connection parameter which includes at least a weight coefficient and a bias $\theta$, the method comprising the steps of:

(a) accepting plural input data x as vectors;

(b) generating an average vector $x_{tot}$ of all vectors x by performing a statistical processing on input data;

(c) forming an initial value $\theta_{10}$ of the intermediate layer from the average vector $x_{tot}$ and the weight coefficient $W_{10}$ of the intermediate layer;

(d) determining said connection parameters beginning with the initial value $\theta_{10}$ according to a back propagation method;

(e) inputting input data to the input layer;

(f) processing the input data through the intermediate layer having the determined weight coefficients; and (g) further processing the data processed through the intermediate layer by means of the output layer, and outputting from the output layer signals indicating one of the predetermined k classes to which the input data belongs.

9. The method according to claim 8, wherein said step (c) comprises generating a vector representing the bias $\theta_{10}$ of the intermediate layer on the basis of $\theta_{10} = W_{10} x_{tot}$ wherein a total average vector of the input data x is denoted by $x_{tot}$.

10. The method according to claim 8, wherein said step (a) accepts the input data x as a vector, further including a step for generating an initial value $W_{10}$ of the weight coefficient of the intermediate layer from an in-class covariant matrix $S_W$ and an inter-class covariant matrix $S_B$ of vector x, and a step of generating the initial value $\theta_{10}$ of the bias of the intermediate layer from the initial value $W_{10}$ and the average vector $x_{tot}$.

11. An apparatus for classifying input data representing a physical quantity into predetermined k classes, each class designating a set including a plurality of data which have similar characteristics, said apparatus comprising:

a back propagation type neural network including an input layer, an output layer and an intermediate layer coupled between the input layer and the output layer; and determining means for determining connection parameters between the layers of said neural network by using training data prior to classifying the input data, the connection parameters being represented by at least a weight coefficient, wherein, the neural network input layer includes means for inputting data;

the neural network intermediate layer includes means for receiving data from the input layer and processing the received data by means of the connection parameters;

the neural network output layer includes means for receiving data processed by the intermediate layer, processing the received data by means of the connection parameters and outputting signals indicating one of the predetermined k classes; and the determining means comprises generating means for generating data representing a weight coefficient matrix $W_{20}$ of the output layer from data representing an average vector $x^{(k)}$ of each class of input data of the input layer, an initial value $W_{10}$ of a weight coefficient matrix of the intermediate layer, and a bias $\theta_{10}$ representing an initial value of a bias of the intermediate layer as beginning values for the back propagation type neural network.

12. The apparatus according to claim 11, wherein said generating means comprises means for generating an average vector $x^{(k)}$ of each class k when the input data is input as a vector, class by class; means for generating a weight coefficient vector $W_{20}^{(k)}$ of each class in accordance with $W_{20}^{(k)} = f(W_{10} x^{(k)} - \theta_{10})$, where f is a transfer function; and means for generating the weight coefficient matrix $W_{20}$ of the output layer by combining the weight coefficient vector $W_{20}^{(k)}$ of each class.

13. The apparatus according to claim 11, wherein said generating means further includes:

means for generating an in-class covariant matrix $S_W$ and an inter-class covariant matrix $S_B$ from said input vector x;

means for generating a mapping A such that the inter-class covariant matrix $S_B$ becomes maximum while keeping the in-class covariant matrix constant;

means for generating said initial value $W_{10}$ by forming a transposed matrix of a matrix representing this mapping A, and means for generating the bias $\theta_{10}$ of the intermediate layer from the total average value $x_{tot}$ of the input data x and the weight coefficient $W_{10}$ of the intermediate layer.

14. A method for classifying input data representing a physical quantity into predetermined k classes, each class designating a set including a plurality of data which have a similar characteristic, by using a back propagation type neural network having an input layer, an output layer and an intermediate layer coupled between the input and output layers, each layer comprising a network of synapse elements and connections between the synapse elements, each connection being represented by a connection parameter which includes at least a weight coefficient and a bias $\theta$, the method comprising the steps of:

(a) partitioning input data x to classes as vectors;

(b) generating an average vector $x^{(k)}$ for each class of input data of the input layer, an initial value $W_{10}$ of a weight coefficient of the intermediate layer, and a vector $\theta_{10}$ representing an initial value of a bias of the intermediate layer by performing a statistical process on the input data;

(c) generating a weight coefficient matrix $W_{20}$ of the output layer from the average vector $x^{(k)}$ the initial value $W_{10}$ of a weight coefficient matrix of the intermediate layer, and the initial value vector $\theta_{10}$ of the bias of the intermediate layer;

(d) determining the connection parameters beginning with these initial values according to a back propagation method;

(e) inputting input data to the input layer;

(f) processing the input data through the intermediate layer having the determined weight coefficients; and (g) further processing the data processed through the intermediate layer by means of the output layer, and outputting from the output layer signals indicating one of the predetermined k classes to which the input data belongs.

15. The method according to claim 14, wherein said step (c) further comprises the steps of (c1) forming an average vector $x^{(k)}$ for each class when input data is input class k by class k as a vector (c2) forming the weight coefficient vector $W_{20}^{(k)}$ of each class in accordance with $$W_{20}^{(k)}=f(W_{10}x^{(k)}-\theta_{10})$$

from the average vector $x^{(k)}$ and said initial values $W_{10}$ and $\theta_{10}$, where f is a transfer function; and (c3) combining the weight coefficient vector $W_{20}^{(k)}$ of each class to generate the weight coefficient matrix $W_{20}$ of the output layer.

16. The method according to claim 14, wherein said step (b) further comprises the steps of:

(b1) forming an in-class covariant matrix $S_W$ and an inter-class covariant matrix $S_B$ from said input vector x;

(b2) forming a mapping A such that the inter-class covariant matrix $S_B$ becomes maximum while keeping the in-class covariant matrix $S_W$ constant and generating said initial value $W_{10}$ by calculating a transposed matrix of a matrix representing this mapping A; and (b3) forming the bias $\theta_{10}$ of the intermediate layer from the total average value $x_{tot}$ of input data x and the weight coefficient $W_{10}$ of the intermediate layer.

17. An apparatus for classifying input data representing a physical quantity into predetermined k classes, each class designating a set including a plurality of data which have similar characteristics, said apparatus comprising:

a back propagation type neural network including an input layer, an output layer, and an intermediate layer coupled between the input layer and the output layer; and determining means for determining connection parameters between the layers of said neural network by using training data prior to classifying the input data, the connection parameters being represented at least by a bias, wherein, the neural network input layer includes means for inputting data;

the neural network intermediate layer includes means for receiving data from the input layer and processing the received data by means of the connection parameters;

the neural network output layer includes means for receiving data processed by the intermediate layer, processing the received data by means of the connection parameters and outputting signals indicating one of the predetermined k classes; and the determining means comprises means for generating a vector $\theta_{20}$ representing an initial value of a bias of the output layer from an initial value $W_{20}$ of a weight coefficient matrix of the output layer as a beginning value for the back propagation type neural network.

18. The apparatus according to claim 17, wherein said generating means comprises:

means for forming the average vector $x^{(k)}$ of each class when input data is input class k by class k as a vector;

means for calculating the weight coefficient vector $W_{20}^{(k)}$ of each class in accordance with $W_{20}^{(k)}=f(W_{10}x^{(k)}-\theta_{10})$, from the average vector $x^{(k)}$ and said initial values $W_{10}$ and $\theta_{10}$ where f is a transfer function;

means for calculating the bias vector $\theta_{20}^{(k)}$ of each class in accordance with $\theta_{20}^{(k)}=\alpha\|W_{20}^{(k)}\|$ from said weight coefficient vector $W_{20}^{(k)}$ of each class and a predetermined constant $\alpha$; and means for combining the bias vector $\theta_{20}(k)$ of each class to generate the bias matrix $\theta_{20}$ of the output layer.

19. The apparatus according to claim 17, wherein said generating means further comprises:

means for forming an in-class covariant matrix $S_B$ and an inter-class covariant matrix from an input vector x;

means for forming a mapping A such that the inter-class covariant matrix $S_B$ becomes maximum while keeping the in-class covariant matrix $S_B$ constant; and means for generating said initial value $W_{10}$ by calculating the transposed matrix of the mapping A;

means for calculating a bias $\theta_{10}$ of the intermediate layer from a total average value $x_{tot}$ of input data x and the weight coefficient $w_{10}$ of the intermediate layer, and means for forming the weight coefficient matrix $W_{20}$ of the output layer from the average vector $x^{(k)}$ of each class of input data of the input layer, an initial value $W_{10}$ of a weight coefficient matrix of the intermediate layer, and a vector $\theta_{10}$ representing the initial value of a bias of the intermediate layer.

20. A method for classifying input data representing a physical quantity into predetermined k classes, each class designating a set including a plurality of data which have a similar characteristic, by using a back propagation type neural network having an input layer, an output layer and an intermediate layer coupled between the input and output layers, each layer comprising a network of synapse elements and connections between the synapse elements, each connection being represented by a connection parameter which includes at least a weight coefficient and a bias $\theta$, the method comprising the steps of:

(a) partitioning input data x for classes as vectors;

(b) generating an initial value $W_{20}$ of a weight coefficient of the output layer by performing a statistical process on the input data;

(c) generating an initial value $\theta_{20}$ of a vector representing a bias of the output layer from the initial value $W20$ of the weight coefficient of the output layer;

(d) determining the connection parameters beginning with these initial values according to a back propagation method;

(e) inputting input data to the input layer;

(f) processing the input data through the intermediate layer having the determined weight coefficients; and (g) further processing the data processed through the intermediate layer by means of the output layer, and outputting from the output layer signals indicating one of the predetermined k classes to which the input data belongs.

21. The method according to claim 20, wherein said step (c) further comprises the steps of:

(c1) forming an average vector $x^{(k)}$ of each class when input data is input class k by class k as a vector (c2) forming a weight coefficient vector $W_{20}^{(k)}$ of each class in accordance with $W20=f(W_{10}x^{(k)}-\theta_{10})$ from the average vector $x^{(k)}$ and said initial values $W_{10}$ and $\theta_{10}$, where f is a transfer function;

(c3) forming a bias vector $\theta_{20}$ of each class in accordance with $\theta_{20}^{(k)}=\alpha\|W_{20}^{(k)}\|$ from said weight coefficient vector $W_{20}(k)$ of each class and a predetermined constant $\alpha$; and (c4) combining the bias vector $\theta_{20}(k)$ of each class to calculate an initial value $\theta_{20}$ of a bias matrix of the output layer.

22. The method according to claim 20, wherein said step (b) further comprises the steps of:

(b1) forming an in-class covariant matrix $S_W$ and an inter-class covariant matrix $S_B$ from said input vector x;

(b2) forming a mapping A such that the inter-class covariant matrix covariant matrix $SB^{becomes}$ maximum while keeping the in-class covariant matrix $S_W$ constant;

(b3) forming an initial value $W_{10}$ by calculating a transposition matrix of a matrix representing the mapping A;

(b4) forming the bias $\theta_{10}$ of the intermediate layer from a total average value $x_{tot}$ of input data x and the weight coefficient $W_{10}$ of the intermediate layer; and (b5) forming the weight coefficient matrix $W_{20}$ of the output layer from the average vector $x^{(k)}$ of each of input data of the input layer, the initial value $W_{10}$ of a weight coefficient matrix of the intermediate layer, and the vector $\theta_{10}$ representing the initial value of a bias of the intermediate layer.

* * * * *

UNITED STATES PATENT AND TRADEMARK OFFICE
CERTIFICATE OF CORRECTION

PATENT NO. : 5,490,236
DATED : February 6, 1996
INVENTOR(S) : TORU NIKI

It is certified that error appears in the above-identified patent and that said Letters Patent is hereby corrected as shown below:

On title page,
Item

[76] INVENTOR:

"[76] Inventor: Toru Niki, c/o Canon Kabushiki Kaisha, 30-2, Shimomaruki 3-chome, Ohta-ku, Tokyo, Japan"

should read
--[75] Inventor: Toru Niki, Yokohama, Japan--.

Item
AT [57] ABSTRACT

Line 3, "coupled" should read --coupled to--.

COLUMN 2

Line 5, "$\partial g/\partial w_{ij}$" should read --$\partial E/\partial w_{ij}$--.

COLUMN 3

Line 23, "$W_{20}(K)$ and bias $\theta_{20}(K)$." should read --$\bar{W}_{20}{}^{(K)}$ and bias $\bar{\theta}_{20}{}^{(K)}$.--.
Line 46, "add" should read --adds--.

UNITED STATES PATENT AND TRADEMARK OFFICE
CERTIFICATE OF CORRECTION

PATENT NO. : 5,490,236
DATED : February 6, 1996
INVENTOR(S) : TORU NIKI

Page 2 of 4

It is certified that error appears in the above-identified patent and that said Letters Patent is hereby corrected as shown below:

COLUMN 4

Line 13, "The indicates" should read
    --The ———— indicates--.
    Line 65, "$(X \epsilon R^M)$" should read --$(x \epsilon R^M)$--.

COLUMN 5

Line 39, "engine vector $a_i$" should read
    --eigen vector $a_i$--

COLUMN 6

Line 32, "$\theta 20^{(k)}$. Then" should read --$\theta 20^{(k)}$, then-- and "zk" should read --$z_k$--.
    Line 38, "$(W_{20}^{(k)T} \cdot y - \theta 20^{(k)}) = 0$" should read
    --$(W_{20}^{(k)T} \cdot y - \theta_{20}^{(k)}) = 0$--.
    Line 54, "$\alpha$is" should read --$\alpha$ is--.

COLUMN 7

Line 45, "comprising" should read --comprising:--.

COLUMN 8

Line 14, "inclass" should read --in-class--.
    Line 15, "interclass" should read --inter-class--.
    Line 49, "and" (second occurrence) should be deleted.
    Line 52, "back" should read --a back--.
    Line 66, "learning" should read --classifying--.

UNITED STATES PATENT AND TRADEMARK OFFICE
CERTIFICATE OF CORRECTION

PATENT NO.  : 5,490,236
DATED       : February 6, 1996
INVENTOR(S) : TORU NIKI

Page 3 of 4

It is certified that error appears in the above-identified patent and that said Letters Patent is hereby corrected as shown below:

COLUMN 11

Line 11, "matrix" should read --matrix $S_W$--
Line 38, "$x^{(k)}$ the" should read --$x^{(k)}$, the--.
Line 54, "of" should read --of:--
Line 57, "vector" should read --vector;--.

COLUMN 12

Line 57, "matrix $S_B$" should read --matrix $S_W$--.
Line 58, "matrix" should read --matrix $S_B$--.
Line 61, "$S_B$" should read --$S_W$--.
Line 67, "$w_{10}$" should read --$W_{10}$--.

COLUMN 13

Line 23, "W20" should read --$W_{20}$--.

UNITED STATES PATENT AND TRADEMARK OFFICE
CERTIFICATE OF CORRECTION

PATENT NO. : 5,490,236
DATED : February 6, 1996
INVENTOR(S) : TORU NIKI

It is certified that error appears in the above-identified patent and that said Letters Patent is hereby corrected as shown below:

COLUMN 14

Line 4, "vector" should read --vector;--.
Line 6, "$W20=f(W_{10}x^{(k)}-\theta_{10})$" should read
--$W_{20}(k)=f(W_{10}x^{(k)}-\theta_{10})$--.

Line 21, "covariant matrix SB becomes" should read
--$S_B$ becomes--.

Signed and Sealed this

Eighth Day of October, 1996

Attest:

BRUCE LEHMAN

Attesting Officer     Commissioner of Patents and Trademarks